T. B. Bleecker
Folding Bedstead,
No. 1,284. Reissued Mar. 4, 1862
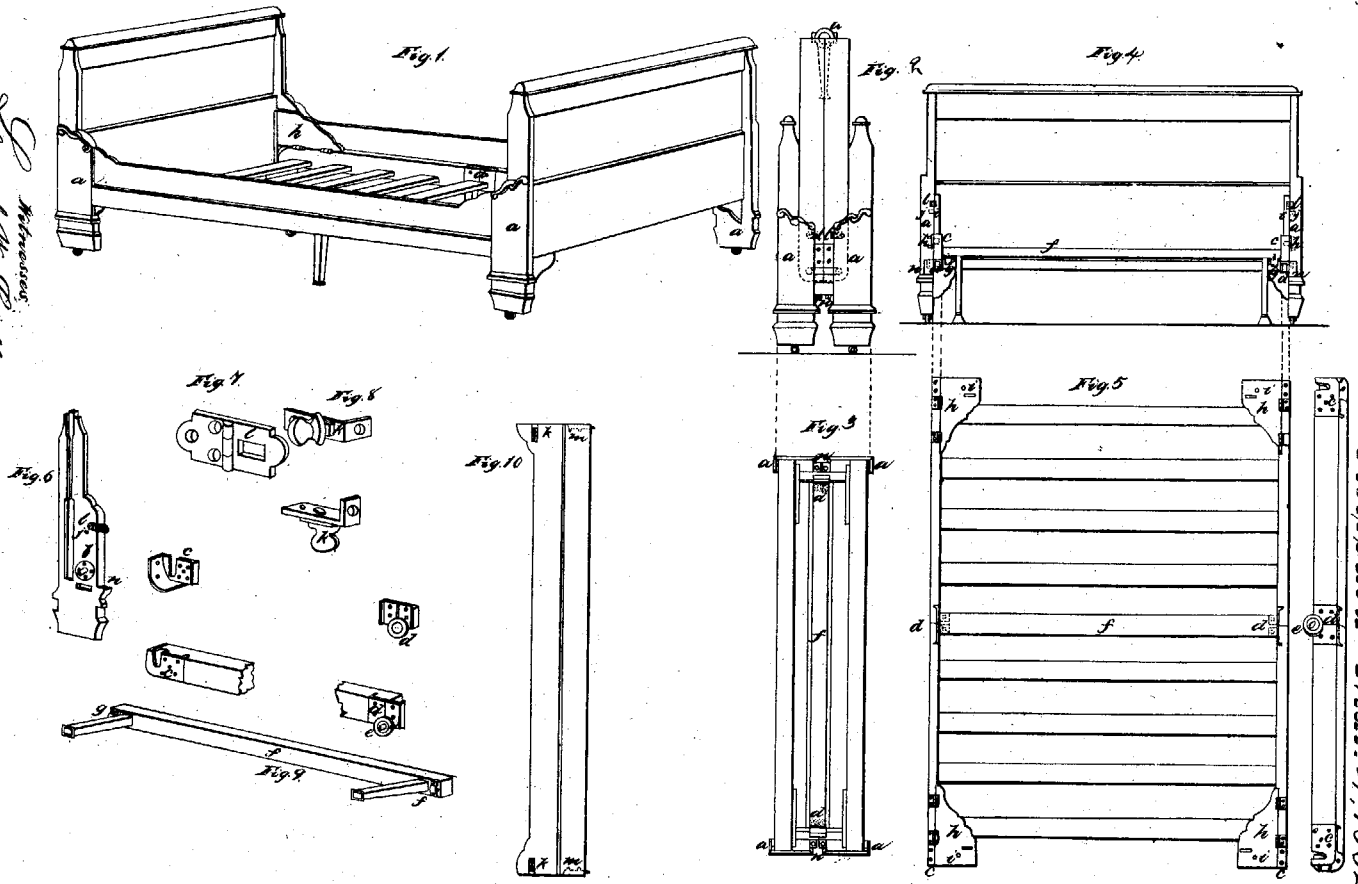
Witnesses:
Lemuel W. Serrell
Wm. Geo. Harvey
N. PETERS, PHOTO-LITHOGRAPHER, WASHINGTON, D. C.

UNITED STATES PATENT OFFICE.

THE NEW YORK WIRE RAILING COMPANY, OF NEW YORK, N. Y., ASSIGNEES OF T. B. BLEECKER, OF SAME PLACE.

IMPROVEMENT IN FOLDING BEDSTEADS.

Specification forming part of Letters Patent No. 5,072, dated April 17, 1847; Reissue No. 1,015, dated July 24, 1860; extended seven years, April 17, 1861; Reissue No. 1,284, dated March 4, 1862.

*To all whom it may concern:*

Be it known that THEOPHYLACT B. BLEECKER, of the city of New York, in the county and State of New York, did invent a new and Improved Mode of Constructing Folding Hinge-Bedsteads; and the following is hereby declared to be a full, clear, and exact description of the said invention, reference being had to the annexed drawings, making part of this specification, wherein—

Figure 1 is a perspective view. Fig. 2 is a front view in folded position. Fig. 3 is a bird's-eye view in folded position. Fig. 4 is a transverse section. Fig. 5 is a bird's-eye view of the hinged frame. Fig. 6 is a view of one of the pillars or posts; Figs. 7 and 8, fastenings for side panels to posts; Fig. 9, supporting-frame; Fig. 10, side panel.

Similar marks of reference denote the same parts.

The two ends of the bedstead—head and foot—are constructed separately, each being formed of two pillars or posts, *a a*, connected by cross-pieces or panels. On the inside of the posts thus separately formed for the respective head and foot guards two metal journals or hinge-bolts, *b b*, are attached, on which the ends of the two side rails (see Fig. 5) of the hinged frame are connected, the metal end plates, *c c*, which are attached to each respective end of said side rails, being formed in the shape of hooks, and in this manner the ends of the side rails are allowed to turn on these bolts or journals, and constitute a joint or hinge. The above-named side rails are connected with slats, and have a hinge, *d*, in the center, the hinge-bolt being on the under side of each rail, which forms a hinged frame and allows the center of the frame to be raised upward when the bedstead is being folded, (see Fig. 2,) in which position the bedstead will stand upright, as shown. When the hinged frame is lowered or extended, the parts of the side rails above the hinge abut closely, and the side rails are prevented from descending below the straight line.

To prevent the frame and center hinge being strained by weight, there are two pivots, *e e*, extended from the inner side of each center hinge, on which a supporting-frame, *f*, is hung by means of irons *g g*, the weight being supported by the two legs attached to the frame. When the bedstead is folded, said frame will maintain a hanging position on the pivots. For the purpose of bracing the bedstead when extended or in an unfolded position, there are four fastenings or braces, *h h h h*, that serve to keep the side rails and head and foot guards in their proper relative positions. These are shown as attached with hinges near the ends of each side rail, each brace having a bolt or pin, *i i i i*, attached, which bolts or pins are pressed into the holes *j j*, Figs. 4 and 6, in each post. Whenever the bedstead is to be folded, these fastenings or braces are to be disconnected or closed down to the frame.

To raise the sides of the bedstead, if required, a panel, Fig. 10, may be fastened to each side by means of bolts *k k* and eye-hinges *l l* for the top fastenings, and the bolts *m m* and steps *n n* for the bottom fastenings, the bolts *m m* at the bottoms of the panels first being inserted into the holes in the brackets *n n*, near the bottom of the posts. The bolts *k k* are then passed through the eyes of the hinges *l l* and turned, which secures the panel to the post.

Whenever the bedstead is to be folded, the center of the hinged frame should be raised, whereby the head and foot ends or guards are drawn together by means of the hinges to the posts. (See Fig. 2.)

The above-described construction may be entirely of iron. In moving double bedsteads it may be well to disconnect the hinged frame from the ends, which is readily done by lifting said frame off the hinge-bolts. This, however, is not required to be done with single or lightly-constructed bedsteads.

What is claimed as the invention of the said THEOPHYLACT B. BLEECKER is—

1. The folding frame hinged in the center and setting within the corner-posts, when such frame is connected directly to the posts themselves by journals or bolts on which the parts turn in folding or unfolding, as set forth.

2. The hook-shaped ends to the side rails of the frame, hinged in the center, taking bolts or journals attached to the posts and forming hinges for the same, or for allowing said frame to be disconnected from the posts, as specified.

3. In a bedstead wherein a frame is employed that is hinged to fold, as set forth, and hinged at its ends directly to the posts, the use of a fastening or brace that retains the hinged frame and posts in their proper relative position, as set forth.

4. In a bedstead where the head and foot guards are constructed substantially as specified, and the bottom is made of a frame hinged to fold in the center, as set forth, locating the journal or bolt *b* on the post so that the bedstead, when folded, will stand upright, as specified.

In witness whereof the said NEW YORK WIRE RAILING COMPANY, assignees of the said THEOPHYLACT B. BLEECKER, have hereunto caused the signature of their president and secretary to be affixed this 21st day of January, 1862.

IRA HUTCHINSON,
*President.*

JOHN B. WICKERSHAM,
*Secretary.*

Witnesses:
LEMUEL W. SERRELL,
THOS. GEO. HAROLD.